(12) United States Patent
Wehnes et al.

(10) Patent No.: US 8,675,933 B2
(45) Date of Patent: Mar. 18, 2014

(54) BREAST SEGMENTATION IN RADIOGRAPHIC IMAGES

(75) Inventors: Jeffrey C. Wehnes, Richardson, TX (US); James H. Pike, Carrollton, TX (US); James P. Monaco, Piscataway, NJ (US)

(73) Assignee: VuCOMP, Inc., Plano, TX (US)

( * ) Notice: Subject to any disclaimer, the term of this patent is extended or adjusted under 35 U.S.C. 154(b) by 500 days.

(21) Appl. No.: 13/168,588

(22) Filed: Jun. 24, 2011

(65) Prior Publication Data

US 2011/0280465 A1 Nov. 17, 2011

Related U.S. Application Data

(63) Continuation-in-part of application No. PCT/US2011/034699, filed on Apr. 29, 2011.

(60) Provisional application No. 61/398,571, filed on Jun. 25, 2010, provisional application No. 61/399,094, filed on Jul. 7, 2010, provisional application No. 61/400,573, filed on Jul. 28, 2010, provisional application No. 61/343,609, filed on May 2, 2010, provisional application No. 61/343,608, filed on May 2, 2010, provisional application No. 61/343,552, filed on May 2, 2010, provisional application No. 61/343,557, filed on Apr. 30, 2010, provisional application No. 61/395,029, filed on May 6, 2010, provisional application No. 61/398,571, filed on Jun. 25, 2010, provisional application No. 61/399,094, filed on Jul. 7, 2010, provisional application No. 61/400,573, filed on Jul. 28, 2010.

(51) Int. Cl.
*G06K 9/00* (2006.01)

(52) U.S. Cl.
USPC ............ 382/128; 382/131; 382/133; 382/266

(58) Field of Classification Search
USPC .................................. 382/128, 130–133, 266
See application file for complete search history.

(56) References Cited

U.S. PATENT DOCUMENTS

| 4,907,156 A | 3/1990 | Doi et al. |
| 5,109,430 A | 4/1992 | Nishihara et al. |

(Continued)

FOREIGN PATENT DOCUMENTS

| WO | WO 2011/137407 | 11/2011 |
| WO | WO 2011/137409 | 11/2011 |

(Continued)

OTHER PUBLICATIONS

"CheckMate™ Ultra with PeerView™ Feature," Product Brochure, R2 Technology, Inc., circa 2002.

(Continued)

*Primary Examiner* — Wesley Tucker
(74) *Attorney, Agent, or Firm* — Slater & Matsil, L.L.P.

(57) ABSTRACT

An image segmentation embodiment comprises generating a start model comprising a set of model points approximating an outline of an object in an initial image, smoothing the image at a first smoothing level, generating a curvature image by applying a second derivative operator, locating second derivative local maxima in the curvature image that are orthogonal to a respective model point and within a search region having a first boundary on one side of the start model and a second boundary on an opposite side of the start model, generating a set of contours, shifting the start model to an outer boundary of the contours, and generating a segmentation mask of the object based on the shifted start model.

23 Claims, 15 Drawing Sheets

(56) References Cited

U.S. PATENT DOCUMENTS

| | | | |
|---|---|---|---|
| 5,133,020 A | 7/1992 | Giger et al. | |
| 5,301,129 A | 4/1994 | McKaughan et al. | |
| 5,359,513 A | 10/1994 | Kano et al. | |
| 5,638,458 A | 6/1997 | Giger et al. | |
| 5,729,620 A | 3/1998 | Wang | |
| 5,828,774 A | 10/1998 | Wang | |
| 5,917,929 A | 6/1999 | Marshall et al. | |
| 5,982,915 A | 11/1999 | Doi et al. | |
| 5,987,094 A | 11/1999 | Clarke et al. | |
| 6,011,862 A | 1/2000 | Doi et al. | |
| 6,014,452 A | 1/2000 | Zhang et al. | |
| 6,075,879 A | 6/2000 | Roehrig et al. | |
| 6,088,473 A | 7/2000 | Xu et al. | |
| 6,125,194 A | 9/2000 | Yeh et al. | |
| 6,138,045 A | 10/2000 | Kupinski et al. | |
| 6,141,437 A | 10/2000 | Xu et al. | |
| 6,198,838 B1 | 3/2001 | Roehrig et al. | |
| 6,233,364 B1 | 5/2001 | Krainiouk et al. | |
| 6,240,201 B1 | 5/2001 | Xu et al. | |
| 6,282,307 B1 | 8/2001 | Armato, III et al. | |
| 6,335,980 B1 | 1/2002 | Armato, III et al. | |
| 6,404,908 B1 | 6/2002 | Schneider et al. | |
| 6,483,934 B2 | 11/2002 | Armato, III et al. | |
| 6,549,646 B1 | 4/2003 | Yeh et al. | |
| 6,577,752 B2 | 6/2003 | Armato, III et al. | |
| 6,609,021 B1 | 8/2003 | Fan et al. | |
| 6,654,728 B1 | 11/2003 | Li et al. | |
| 6,683,973 B2 | 1/2004 | Li et al. | |
| 6,694,046 B2 | 2/2004 | Doi et al. | |
| 6,724,925 B2 | 4/2004 | Armato, III et al. | |
| 6,738,499 B1 | 5/2004 | Doi et al. | |
| 6,760,468 B1 | 7/2004 | Yeh et al. | |
| 6,766,043 B2 | 7/2004 | Zeng et al. | |
| 6,795,521 B2 | 9/2004 | Hsu et al. | |
| 6,801,645 B1 | 10/2004 | Collins et al. | |
| 6,813,375 B2 | 11/2004 | Armato, III et al. | |
| 7,043,066 B1 | 5/2006 | Doi et al. | |
| 7,054,473 B1 | 5/2006 | Roehrig et al. | |
| 7,088,850 B2 | 8/2006 | Wei et al. | |
| 7,203,349 B2 | 4/2007 | Zhang et al. | |
| 7,336,809 B2 | 2/2008 | Zeng et al. | |
| 7,346,202 B1 | 3/2008 | Schneider | |
| 7,359,538 B2 | 4/2008 | Zeng et al. | |
| 7,397,938 B2 | 7/2008 | Cathier | |
| 7,403,646 B2 | 7/2008 | Sato | |
| 7,480,401 B2 | 1/2009 | Shen et al. | |
| 7,492,968 B2 | 2/2009 | Jerebko et al. | |
| 7,593,561 B2 | 9/2009 | Zhang et al. | |
| 7,616,818 B2 * | 11/2009 | Dewaele | 382/199 |
| 7,646,902 B2 * | 1/2010 | Chan et al. | 382/128 |
| 8,164,039 B2 * | 4/2012 | Bovik et al. | 250/208.1 |
| 8,165,385 B2 * | 4/2012 | Reeves et al. | 382/154 |
| 8,260,014 B2 * | 9/2012 | Chen et al. | 382/128 |
| 2001/0008562 A1 | 7/2001 | Rogers et al. | |
| 2002/0016539 A1 | 2/2002 | Michaelis et al. | |
| 2002/0041702 A1 | 4/2002 | Takeo et al. | |
| 2003/0007598 A1 | 1/2003 | Wang et al. | |
| 2004/0161141 A1 | 8/2004 | Dewaele | |
| 2005/0008211 A1 | 1/2005 | Xu et al. | |
| 2005/0010106 A1 | 1/2005 | Lang et al. | |
| 2006/0083418 A1 | 4/2006 | Watson et al. | |
| 2006/0171573 A1 | 8/2006 | Rogers | |
| 2006/0177125 A1 | 8/2006 | Chan et al. | |
| 2006/0239541 A1 | 10/2006 | Florin et al. | |
| 2006/0285751 A1 | 12/2006 | Wu et al. | |
| 2007/0019852 A1 | 1/2007 | Schildkraut et al. | |
| 2007/0092864 A1 | 4/2007 | Reinhardt et al. | |
| 2007/0237401 A1 | 10/2007 | Coath et al. | |
| 2008/0002873 A1 | 1/2008 | Reeves et al. | |
| 2008/0037852 A1 | 2/2008 | Zhou et al. | |
| 2008/0037853 A1 | 2/2008 | Bernard et al. | |
| 2008/0292194 A1 | 11/2008 | Schmidt et al. | |
| 2008/0298666 A1 | 12/2008 | Siddu et al. | |
| 2008/0317322 A1 | 12/2008 | Acharyya et al. | |
| 2009/0052763 A1 | 2/2009 | Acharyya et al. | |
| 2009/0097730 A1 | 4/2009 | Kasai et al. | |
| 2009/0116716 A1 | 5/2009 | Zhou | |
| 2009/0129657 A1 | 5/2009 | Huo et al. | |
| 2009/0171236 A1 | 7/2009 | Davies | |
| 2009/0180674 A1 | 7/2009 | Chen et al. | |
| 2009/0214099 A1 | 8/2009 | Merlet | |
| 2010/0002929 A1 | 1/2010 | Sammak et al. | |
| 2010/0008424 A1 | 1/2010 | Pace | |
| 2010/0054563 A1 | 3/2010 | Mendonca et al. | |
| 2010/0098343 A1 | 4/2010 | Perronnin et al. | |
| 2010/0104148 A1 | 4/2010 | Bovik et al. | |
| 2011/0274327 A1 | 11/2011 | Wehnes et al. | |
| 2011/0280465 A1 | 11/2011 | Wehnes et al. | |

FOREIGN PATENT DOCUMENTS

| | | |
|---|---|---|
| WO | WO 2011/137410 | 11/2011 |
| WO | WO 2011/137411 | 11/2011 |
| WO | WO 2012/006318 | 1/2012 |

OTHER PUBLICATIONS

"The ImageChecker® Technology," Patient Pamphlet, R2 Technology, Inc., circa 2002.

"ImageChecker™ CT: Server DICOM Conformance Statement," PN 390-00-448 Rev. C, R2 Technology, Inc., Sep. 2003.

"ImageChecker™ CT: Workstation DICOM Conformance Statement," PN 390-00-449 Rev. D, R2 Technology, Inc., Sep. 2003.

"Improving Sensitivity and Efficiency in Lung CT Nodule Detection," ImageChecker® CT LN-1000, Product Brochure, R2 Technology, Inc., circa 2003.

"Improving Sensitivity and Efficiency in Lung CT Nodule Detection," ImageChecker® CT, Product Brochure, R2 Technology, Inc., circa 2003.

"Integrated Tools for Streamlined Review of MDCT Lung Exams," ImageChecker® CT LN-500, Product Brochure, R2 Technology, Inc., circa 2003.

"OmniCad," Product Brochure, R2 Technology, Inc., Oct. 16, 2003.

"R2 Algorithm: The Intuitive Choice," Product Brochure, R2 Technology, Inc., 2003.

"The Total CAD Solution for Film and Digital Mammography," ImageChecker® DM, Product Brochure, R2 Technology, Inc., 2003.

"CheckMate™ Ultra with PeerView™," Webpage, http://www.r2tech.com/prd/prd005.html, R2 Technology, Inc., 2004, downloaded Jan. 16, 2004.

"Technical Specifications Sheet for the ImageChecker® Display Units," R2 Technology, Inc., 2004.

"Technical Specifications Sheet for the ImageChecker® Processing Units," R2 Technology, Inc., 2004.

R2 Technology, Inc. Products Overview Webpage, http://www.r2tech.com/prd/index.html, downloaded Jan. 16, 2004, 1 page.

R2 Technology, Inc. ImageChecker® Product Webpage, archived at http://web.archive.org/web/20040422174630/http://www.r2tech.com/prd/prd002.html, archive date Apr. 22, 2004, downloaded Jan. 7, 2013, 2 pages.

R2 Technology, Inc. Algorithm Webpage, archived at http://web.archive.org/web/20040225065830/http://www.r2tech.com/prd/prd001.html, archive date Feb. 25, 2004, downloaded Jan. 7, 2013, 2 pages.

R2 Technology, Inc. Products Overview Webpage, archived at http://web.archive.org/web/20040216010921/http://www.r2tech.com/prd.index.html, archive date Feb. 16, 2004, downloaded Jan. 7, 2013, 5 pages.

Wijk, C.V., "Detection and Segmentation of Colonic Polyps on Implicit Isosurfaces by Second Principle Curvature Flow," IEEE Transactions on Medical Imaging, vol. 29, No. 3, Mar. 2010, pp. 688-698.

* cited by examiner

BREAST SEGMENTATION IN RADIOGRAPHIC IMAGES

This application claims the benefit of U.S. Provisional Application Ser. No. 61/398,571, filed on Jun. 25, 2010, U.S. Provisional Application Ser. No. 61/399,094, filed on Jul. 7, 2010, and U.S. Provisional Application Ser. No. 61/400,573, filed on Jul. 28, 2010, and is a continuation-in-part of International Application No. PCT/US2011/034699, filed on Apr. 29, 2011, which claims the benefit of U.S. Provisional Application Ser. No. 61/343,609, filed on May 2, 2010, U.S. Provisional Application Ser. No. 61/343,608, filed on May 2, 2010, U.S. Provisional Application Ser. No. 61/343,552, filed on May 2, 2010, U.S. Provisional Application Ser. No. 61/343,557, filed on Apr. 30, 2010, U.S. Provisional Application Ser. No. 61/395,029, filed on May 6, 2010, U.S. Provisional Application Ser. No. 61/398,571, filed on Jun. 25, 2010, U.S. Provisional Application Ser. No. 61/399,094, filed on Jul. 7, 2010, and U.S. Provisional Application Ser. No. 61/400,573, filed on Jul. 28, 2010, all of which applications are hereby incorporated herein by reference.

TECHNICAL FIELD

The present disclosure relates generally to computer-aided detection of tissue areas in radiographic images, and more particularly to a breast segmentation system and method.

BACKGROUND

Radiologists use radiographic images such as mammograms to detect and pinpoint suspicious lesions in a patient as early as possible, e.g., before a disease is readily detectable by other, intrusive methods. As such, there is real benefit to the radiologist being able to locate, based on imagery, extremely small cancerous lesions and precursors. Microcalcifications, particularly those occurring in certain types of clusters, exemplify one signature of concern. Although the individual calcifications tend to readily absorb radiation and can thus appear quite bright in a radiographic image, various factors including extremely small size, occlusion by other natural structure, appearance in a structurally "busy" portion of the image, all sometimes coupled with radiologist fatigue, may make some calcifications hard to detect upon visual inspection.

Computer-Aided Detection (CAD) algorithms have been developed to assist radiologists in locating potential lesions in a radiographic image. CAD algorithms operate within a computer on a digital representation of the mammogram set for a patient. The digital representation can be the original or processed sensor data, when the mammograms are captured by a digital sensor, or a scanned version of a traditional film-based mammogram set. An "image," as used herein, is assumed to be at least two-dimensional data in a suitable digital representation for presentation to CAD algorithms, without distinction to the capture mechanism originally used to capture patient information. The CAD algorithms search the image for objects matching a signature of interest, and alert the radiologist when a signature of interest is found.

BRIEF DESCRIPTION OF THE DRAWINGS

The following is a brief description of the drawings, which illustrate exemplary embodiments of the present invention and in which.

DETAILED DESCRIPTION OF ILLUSTRATIVE EMBODIMENTS

Figure 1:
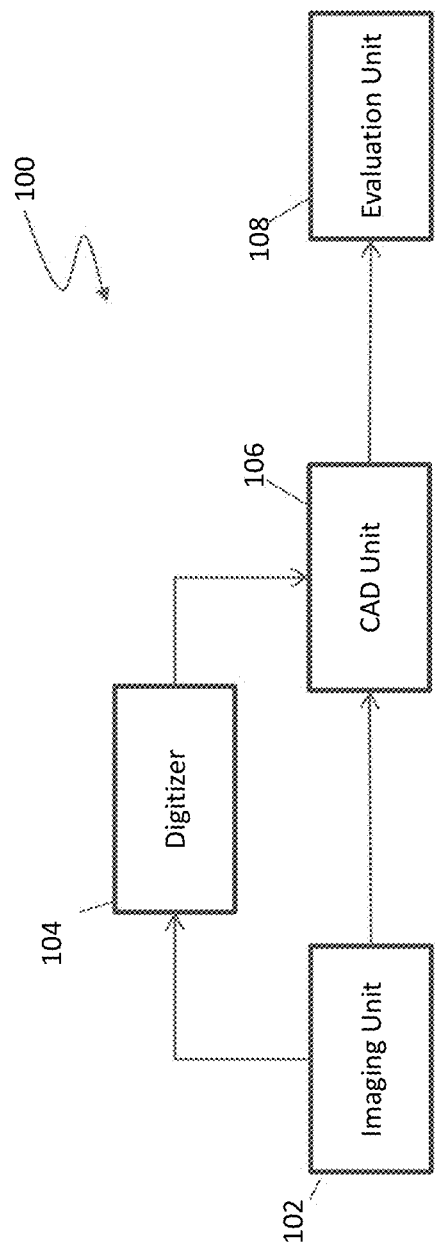
FIG. 1 is a system-level diagram for an anomaly detection system in accordance with an embodiment.

The making and using of embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

For example, embodiments discussed herein are generally described in terms of assisting medical personnel in the examination of breast x-ray images, such as those that may be obtained in the course of performing a mammogram. Other embodiments, however, may be used for other situations, including, for example, detecting anomalies in other tissues such as lung tissue, any type of image analysis for statistical anomalies, and the like.

Referring now to the drawings, wherein like reference numbers are used herein to designate like or similar elements throughout the various views, illustrative embodiments of the present invention are shown and described. The figures are not necessarily drawn to scale, and in some instances the drawings have been exaggerated and/or simplified in places for illustrative purposes only. One of ordinary skill in the art will appreciate the many possible applications and variations of the present invention based on the following illustrative embodiments of the present invention.

Referring first to FIG. 1, a system 100 for assisting in detecting anomalies during, for example, mammograms, is illustrated in accordance with an embodiment. The system 100 includes an imaging unit 102, a digitizer 104, and a computer aided detection (CAD) unit 106. The imaging unit 102 captures one or more images, such as x-ray images, of the area of interest, such as the breast tissue. In the embodiment in which the system 100 is used to assist in analyzing a mammogram, a series of four x-ray images may be taken while the breast is compressed to spread the breast tissue, thereby aiding in the detection of anomalies. The series of four x-ray images include a top-down image, referred to as a cranio caudal (CC) image, for each of the right and left breasts, and an oblique angled image taken from the top of the sternum angled downwards toward the outside of the body, referred to as the medio lateral oblique (MLO) image, for each of the right and left breasts.

The one or more images may be embodied on film or digitized. Historically the one or more images are embodied as x-ray images on film, but current technology allows for x-ray images to be captured directly as digital images in much the same way as modern digital cameras. As illustrated in FIG. 1, a digitizer 104 allows for digitization of film images into a digital format. The digital images may be formatted in any suitable format, such as industry standard Digital Imaging and Communications in Medicine (DICOM) format.

The digitized images, e.g., the digitized film images or images captured directly as digital images, are provided to a Computer-Aided Detection (CAD) unit 106. As discussed in greater detail below, the CAD unit 106 processes the one or more images to detect possible locations of various types of anomalies, such as calcifications, relatively dense regions, distortions, and/or the like. Once processed, locations of the possible anomalies, and optionally the digitized images, are provided to an evaluation unit 108 for viewing by a radiologist, the attending doctor, or other personnel, with or without markings indicating positions of any detected possible anomalies. The evaluation unit 108 may comprise a display, a workstation, portable device, and/or the like.

Figure 2:
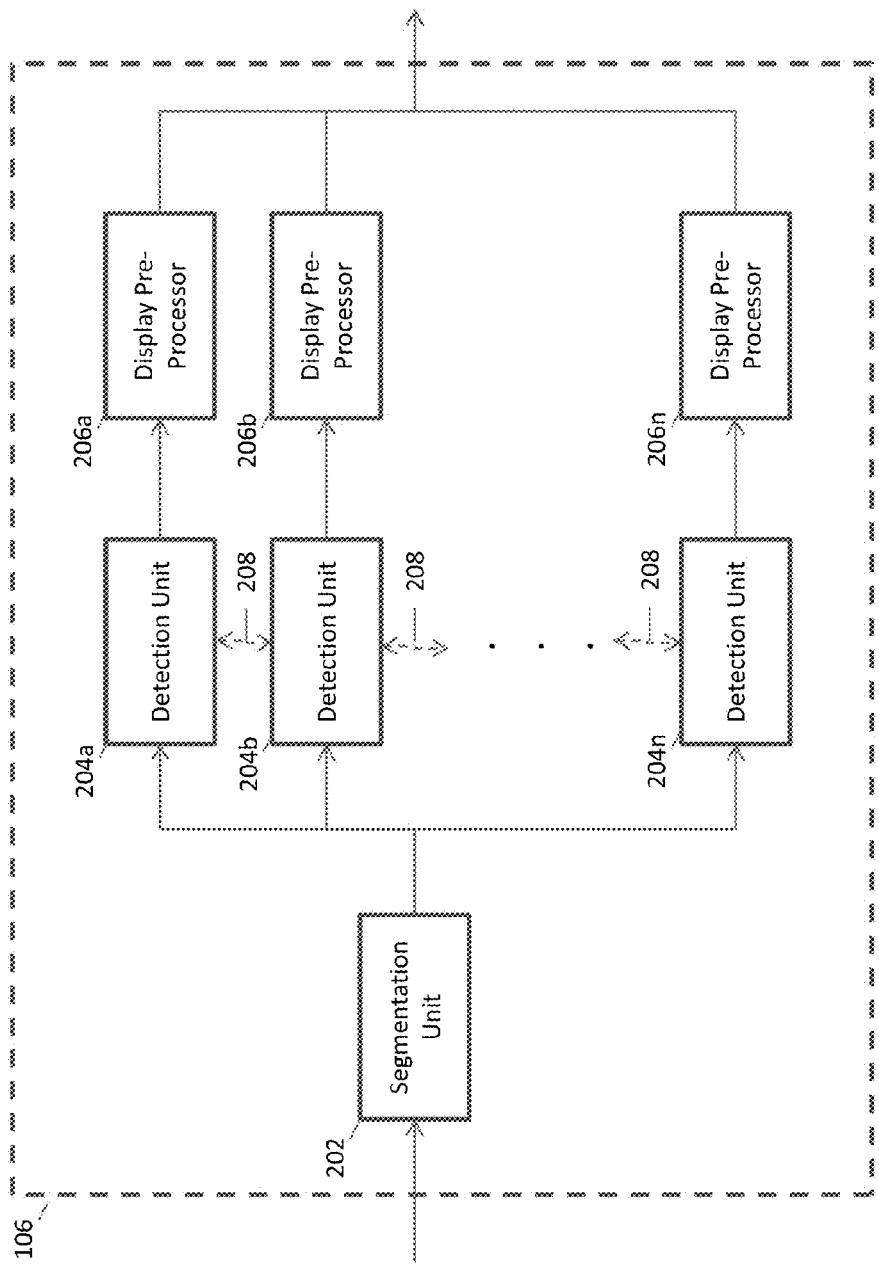
FIG. 2 is a component diagram of a Computer-Aided Detection (CAD) unit in accordance with an embodiment.

FIG. 2 illustrates components that may be utilized by the CAD unit 106 (see FIG. 1) in accordance with an embodiment. Generally, the CAD unit 106 includes a segmentation unit 202, one or more detection units 204a-204n, and one or more display pre-processors 206a-206n. As will be appreciated, an x-ray image, or other image, may include regions other than those regions of interest. For example, an x-ray image of a breast may include background regions as well as other structural regions such as the pectoral muscle. In these situations, it may be desirable to segment the x-ray image to define a search area, e.g., a bounded region defining the breast tissue, on which the one or more detection units 204a-204n is to analyze for anomalies.

The one or more detection units 204a-204c analyze the one or more images, or specific regions as defined by the segmentation unit 202, to detect specific types of features that may indicate one or more specific types of anomalies in the patient. For example, in an embodiment for use in examining human breast tissue, the detection units 204a-204n may comprise a calcification unit, a density (mass) unit, and a distortion unit. As is known in the medical field, the human body often reacts to cancerous cells by surrounding the cancerous cells with calcium, creating micro-calcifications. These micro-calcifications may appear as small, bright regions in the x-ray image. The calcification unit detects and identifies these regions of the breast as possible micro-calcifications.

It is further known that cancerous regions tend to be denser than surrounding tissue, so a region appearing as a generally brighter region indicating denser tissue than the surrounding tissue may indicate a cancerous region. Accordingly, the density unit analyzes the one or more breast x-ray images to detect relatively dense regions in the one or more images. Because the random overlap of normal breast tissue may sometimes appear suspicious, in some embodiments the density unit may correlate different views of an object, e.g., a breast, to determine if the dense region is present in other corresponding views. If the dense region appears in multiple views, then there is a higher likelihood that the region is truly malignant.

The distortion unit detects structural defects resulting from cancerous cells effect on the surrounding tissue. Cancerous cells frequently have the effect of "pulling in" surrounding tissue, resulting in spiculations that appear as a stretch mark, star pattern, or other linear line patterns.

It should be noted that the above examples of the detection units 204a-204n, e.g., the calcification unit, the density unit, and the distortion unit, are provided for illustrative purposes only and that other embodiments may include more or fewer detection units. It should also be noted that some detection units may interact with other detection units, as indicated by the dotted line 208. The detection units 204a-204n are discussed in greater detail below with reference to FIG. 3.

The display pre-processors 206a-206n create image data to indicate the location and/or the type of anomaly. For example, micro-calcifications may be indicated by a line encircling the area of concern by one type of line (e.g., solid lines), while spiculations (or other type of anomaly) may be indicated by a line encircling the area of concern by another type of line (e.g., dashed lines).

Figure 3:
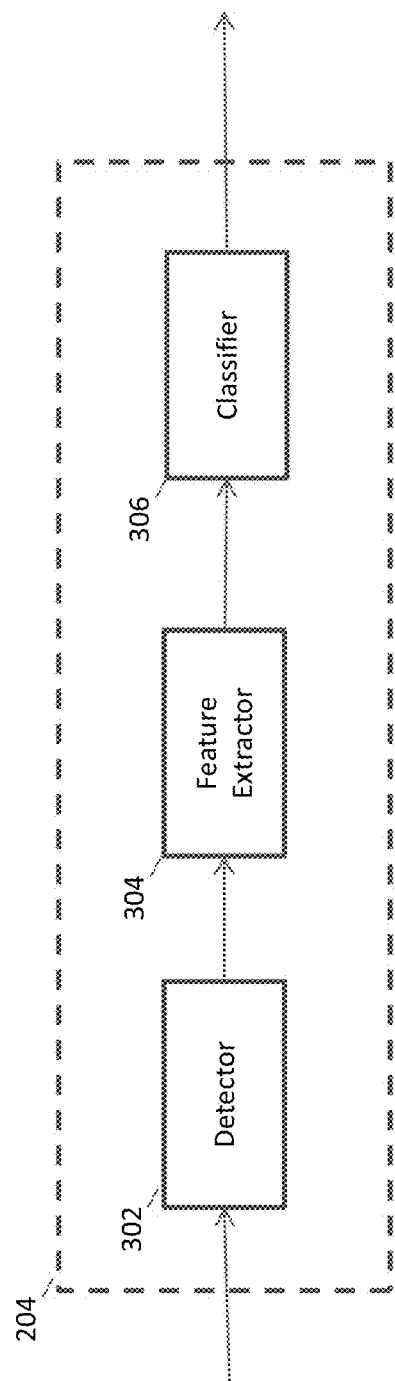
FIG. 3 is a component diagram of a detection unit in accordance with an embodiment.

FIG. 3 illustrates components of that may be utilized for each of the detection units 204a-204n in accordance with an embodiment. Generally, each of the detection units 204a-204n may include a detector 302, a feature extractor 304, and a classifier 306. The detector 302 analyzes the image to identify attributes indicative of the type of anomaly that the detection unit is designed to detect, such as calcifications, and the feature extractor 304 extracts predetermined features of each detected region. For example, the predetermined features may include the size, the signal-to-noise ratio, location, and the like.

The classifier 306 examines each extracted feature from the feature extractor 304 and determines a probability that the extracted feature is an abnormality. Once the probability is determined, the probability is compared to a threshold to determine whether or not a detected region is to be reported as a possible area of concern.

A suitable segmentation unit 202 is specified in U.S. Provisional Application Ser. Nos. 61/400,573 and 61/398,571 and co-filed U.S. patent application Ser. No. 13/168,614, suitable detection units for use in detecting and classifying microcalcifications are specified in U.S. Provisional Application Ser. Nos. 61/343,557 and 61/343,609 and International Application No. PCT/US2011/034696, a suitable detection unit for detecting and classifying malignant masses is specified in U.S. Provisional Application Ser. No. 61/343,552 and International Application No. PCT/US2011/034698, a suitable detection unit for detecting and classifying spiculated malignant masses is specified in U.S. Provisional Application Ser. No. 61/395,029 and International Application No. PCT/US2011/034699, a suitable probability density function estimator is specified in U.S. Provisional Application Ser. No. 61/343,608 and International Application No. PCT/US2011/034700, and suitable display pre-processors are specified in U.S. Provisional Application Ser. No. 61/399,094, all of which are incorporated herein by reference.

The following paragraphs provide greater details regarding a segmentation unit, such as may be utilized as a segmentation unit 202 (see FIG. 2) in accordance with an embodiment. In particular, the embodiments described below seek to segment a radiographic image.

A mammogram can contain background areas, image artifacts, breast tissue, and non-breast tissue regions in some views. A proper segmentation of the image, with the boundaries between each of these areas defined correctly, can provide benefits to CAD performance. First, it instills a radiologist with confidence in the CAD algorithms when a well-segmented image is displayed to the radiologist (and can have the opposite effect when the algorithms identify non-tissue regions as breast and place a suspicious mark outside of the breast area). It is important for thorough examination, however, that the CAD algorithms examine the entire breast portion of the image. This requires that the segmentation not be under inclusive. Also, some CAD algorithms, such as an algorithm that adjusts the base intensity of the image skin line region and algorithms that rely on calcium statistics, can be particularly sensitive to segmentation accuracy.

Figure 4B:
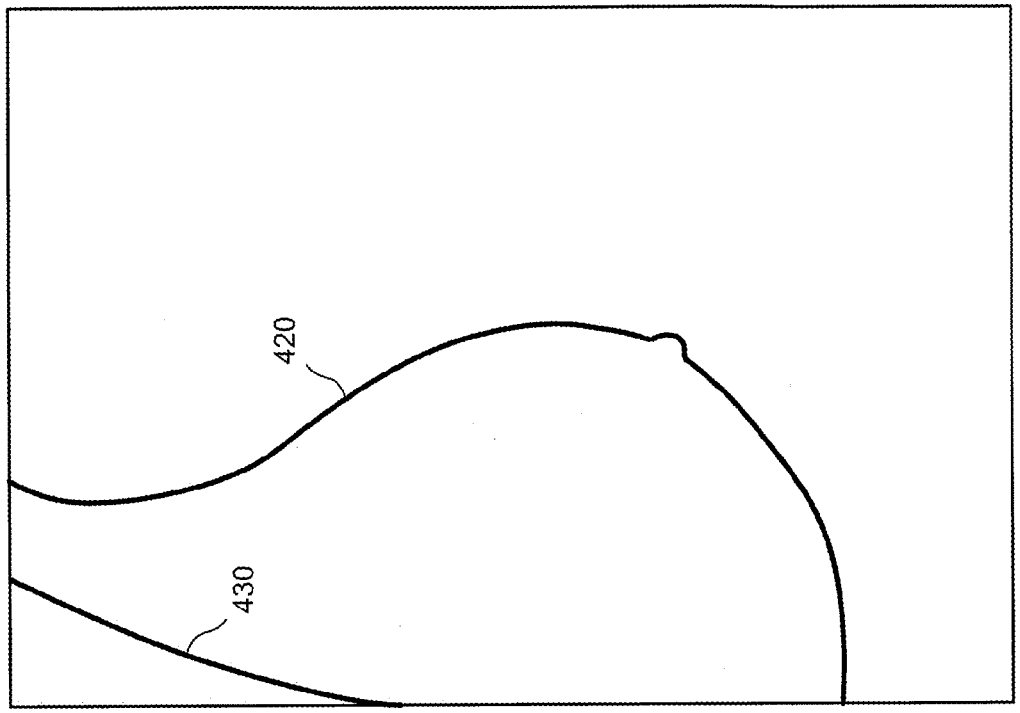
FIGS. 4A and 4B contain examples of an ideal segmentation boundary for, respectively, CC and MLO views of a breast.
Figure 4A:
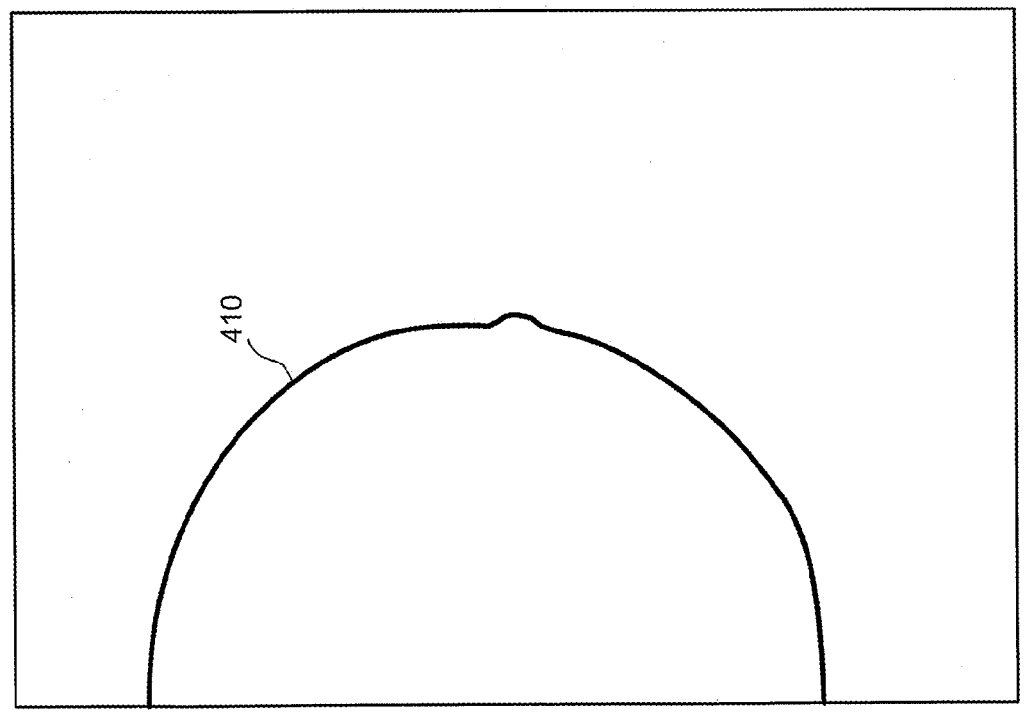

FIGS. 4A and 4B illustrate "ideal segmentations" for a hypothetical cranio-caudal (CC) view, 410, FIG. 4A, and a corresponding hypothetical mediolateral oblique (MLO) view, 420, FIG. 4B. In the following embodiments, a few a priori assumptions generally are made about the location of breast tissue in an image, due to variation in breast size and shape, operator positioning of the image device, etc. Generally, as shown in FIGS. 4A and 4B, the breast meets one edge of the image, e.g., the left edge (or can be flipped right-to-left to place the breast edge on the left, based on simple intensity measures). For a CC view, it is expected that a partial ellipse can roughly describe the breast tissue portion of the image. For an MLO view, it is expected that a partial ellipse will roughly describe the central imaged portion of the breast, but a skin line will typically vary from the ellipse and become more vertical near the top of the image, and end along the top of the image. Also, a pectoral line 430, with substantially more image density behind it than in the neighboring breast tissue, is generally visible cutting across the upper left portion of the breast region. It is the goal of segmentation to describe, as accurately as possible, the locations of skin lines 410 and 420, and the pectoral line 430.

Figure 5:
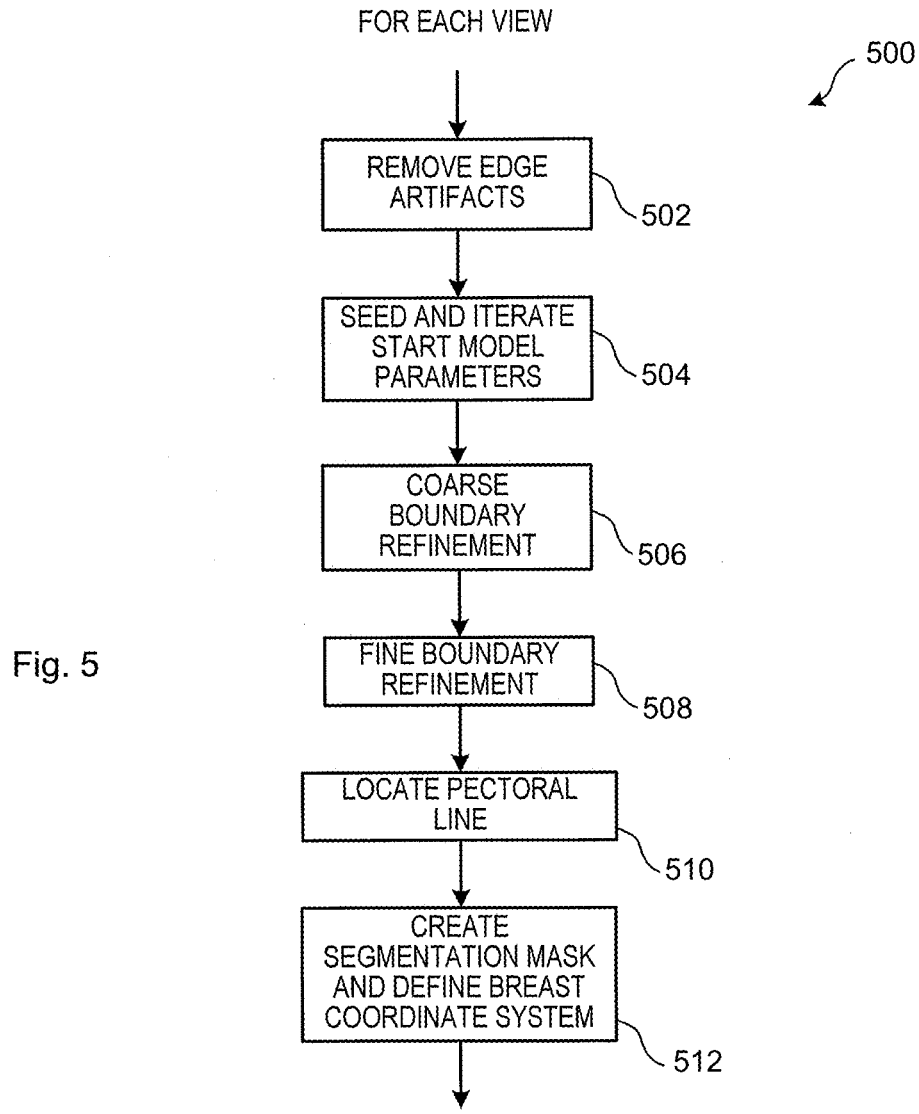
FIG. 5 contains a flowchart for a segmentation procedure according to an embodiment.

FIG. 5 contains a block diagram 500 for breast segmentation including an embodiment. Segmentation operates independently on each view presented to the system. Block 502 performs simple removal of edge artifacts. Block 504 then creates a start model, or initial informed "guess" as to the rough boundaries of the breast. The start model is fed to a two-stage refinement process, coarse boundary refinement 506 and fine boundary refinement 508. Each stage uses a common algorithm to more precisely align the boundary description with the actual imaged skin line, with stage 508 operating on a finer resolution image that stage 506. On MLO views, a stage 510 proceeds to locate and describe the pectoral line in the image. Stage 512 compiles the segmentation information into a segmentation mask that is passed to the CAD algorithms, along with the coordinates of a pectoral-nipple coordinate system.

The remove artifacts stage 502 seeks to mask out image areas from consideration that might confuse segmentation, and are obviously not tissue regions. For instance, a bright edge may appear as a straight line parallel or nearly parallel to an image edge, as a scanner or film alignment artifact. Such artifacts are easily detected and masked from consideration during segmentation.

In a given embodiment, the start model stage 504 need do no more than get close—and not very close—to the rough shape and location of the breast. Acceptable techniques may vary depending on how the image is captured. For instance, some digital mammography systems may be calibrated to sense clear-path radiation dose and thus create a fairly accurate start model that rejects background regions based on a lack of radiation absorption. For scanned film, simple histogram or intensity techniques, or a simpler method based on the contour methods discussed herein, can provide an acceptable start model.

Figure 6A:
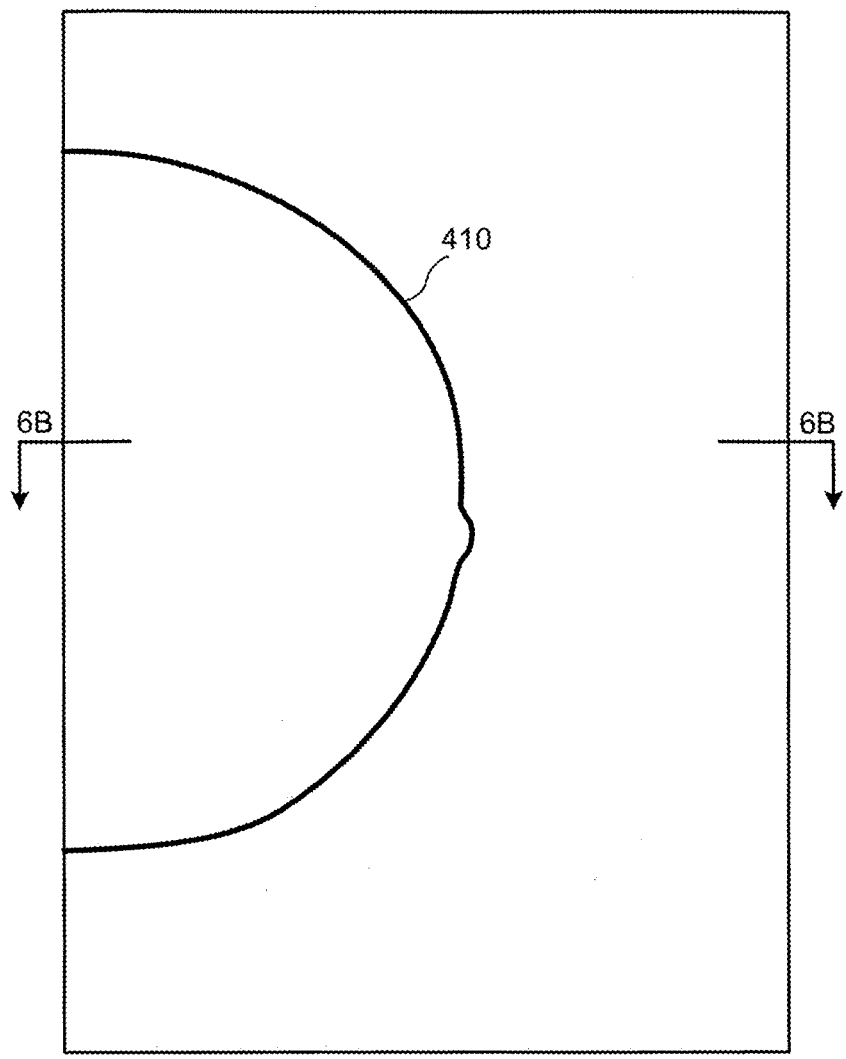
FIGS. 6A-6D show, respectively, a hypothetical mammogram, a smoothed intensity cross-section from the mammogram, and first and second derivatives of the cross-section.
Figure 6B:
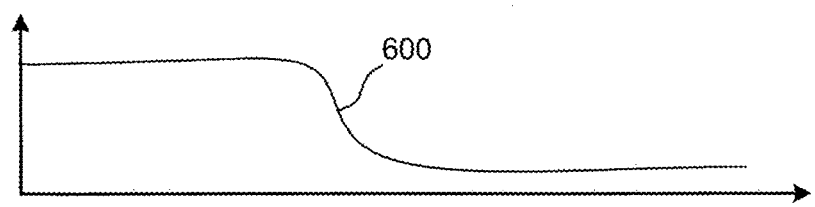
Figure 6C:
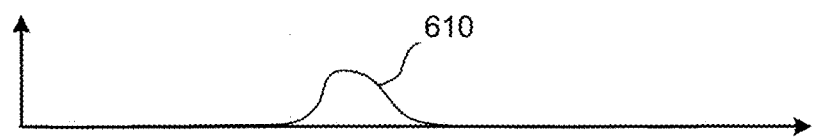
Figure 6D:
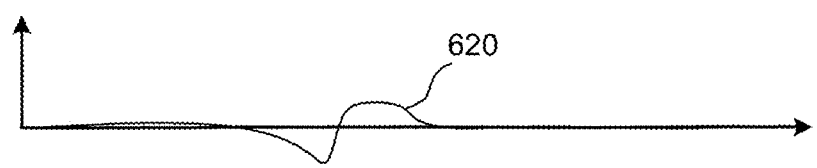

FIG. 6A is a copy of FIG. 4A, with cross-section indicators for FIG. 6B superimposed. Due to the manner in which a mammography machine compresses a breast for imaging, the majority of the imaged breast has a uniform thickness (and therefore background density in the image), tapering only in a peripheral region to a thin skin line at the breast boundary. FIG. 6B shows a smoothed intensity curve 600 for one typical cross-section through the image. FIG. 6C shows the first derivative 610 of intensity curve 600, and FIG. 6D shows the second derivative 620 of intensity curve 600. In particular, the second derivative properties weigh significantly in the detection of the breast boundary.

In one embodiment of coarse boundary refinement 506, an input image (with artifacts removed) is integer subsampled to roughly a 1000-micron pixel spacing. The subsampled image is then smoothed, e.g., by convolution with a two-dimensional Gaussian function with significant (multipixel) smoothing to remove fine detail. The coarse boundary refinement stage 506 can include multiple iterations, at progressively less smoothing factors, to provide detection of finer curvature boundaries at each iteration. For instance, the Gaussian smoothing standard deviation can be halved each boundary refinement iteration, e.g., by using 8, 4, 2, 1 pixel standard deviations at successive smoothing iterations. After smoothing, a two-dimensional second derivative operator is convolved with the smoothed, subsampled image to create a "curvature" image.

One embodiment uses three separate two-dimensional second derivative operators to measure curvature in x, curvature in y, and curvature along the diagonals. These are then combined in a Hessian matrix that describes the curvature at each point:

$$H = \begin{vmatrix} \frac{\partial^2}{\partial x \partial x} & \frac{\partial^2}{\partial x \partial y} \\ \frac{\partial^2}{\partial x \partial y} & \frac{\partial^2}{\partial y \partial y} \end{vmatrix}$$

The Hessian matrix at each point is then decomposed to extract two eigenvalues and an angle of orientation for the major/minor axes of the Hessian:

$$H = \begin{bmatrix} \cos\theta & \sin\theta \\ -\sin\theta & \cos\theta \end{bmatrix} \begin{bmatrix} \lambda_1 & 0 \\ 0 & \lambda_2 \end{bmatrix} \begin{bmatrix} \cos\theta & -\sin\theta \\ \sin\theta & \cos\theta \end{bmatrix}$$

Examination of eigenvalues $\lambda_1$ and $\lambda_2$ determines the type of curvature present at each point. When both eigenvalues are positive, the intensity distribution is concave up at the point Likewise, when both eigenvalues are negative, the intensity distribution is concave down at the point. And when one eigenvalue is positive and the other is negative, the point is a saddle point.

As the presence of tissue in the path of x-rays causes absorption as compared to the free-air path in areas adjoining a tissue region, the present embodiment relies on the fact that moving along an image path that crosses a skin line will result in an increase in image intensity, and therefore a concave up curvature signal. Accordingly, the present embodiment masks out points where both eigenvalues are negative. When at least one eigenvalue is positive, the present embodiment selects that eigenvalue for consideration, and adjusts θ if necessary to align with (rather than orthogonal to) the direction of curvature of the largest positive eigenvalue. As an option, points can be masked from consideration when the largest positive eigenvalue fails to meet a threshold set greater than zero, and/or when one eigenvalue is positive and the other negative, the magnitude of the negative eigenvalue exceeds the positive eigenvalue.

In one embodiment, the first derivative of the smoothed image is calculated as well, and used to guide the selection of the proper curvature orientation. Two 3×3 pixel first derivative operators, one oriented horizontally and the other oriented vertically, calculate respective intensity slopes Dx and Dy at each pixel. The system combines the intensity slopes Dx and Dy to determine a first derivative slope direction, $θ_1$. The dot product of two unit vectors, one oriented at θ and the other oriented at $θ_1$ will have a negative sign when θ is pointed "downslope," i.e., toward dimmer image values. In this case, the dot product calculation informs the system to adjust θ by 180 degrees.

Figure 7B:
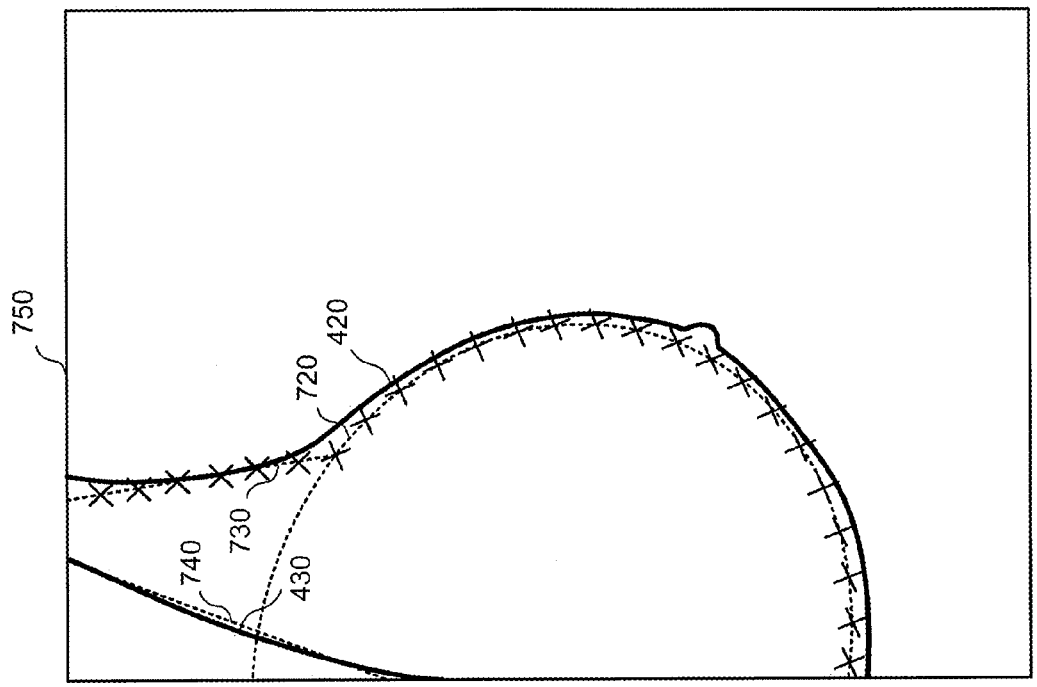
FIGS. 7A and 7B show, respectively, segmentation start models for the ideal segmentation boundaries of FIGS. 1A and 1B.
Figure 7A:
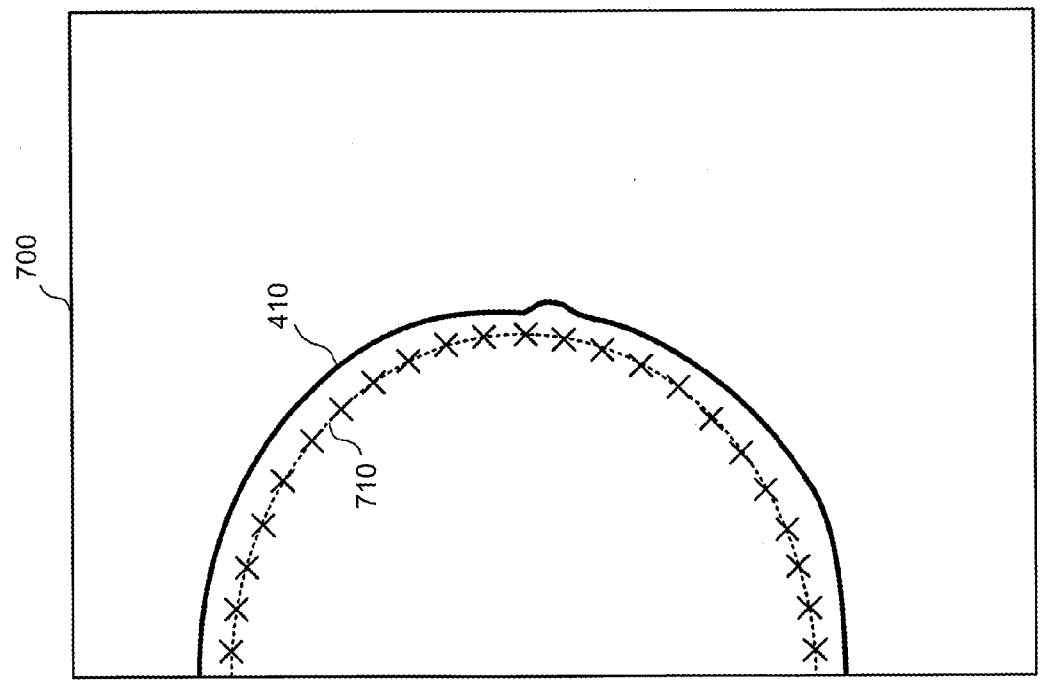

FIGS. 7A and 7B illustrate the breast outlines 410, 420 of FIGS. 4A and 4B, respectively, with overlaid start models, shown as dashed lines connecting a set of start model points. In FIG. 7A, the start model 710 for breast boundary 410 is passed to coarse boundary refinement as a set of start points, marked in FIG. 7A by Xs. Since FIG. 7B contains an MLO view containing both a breast boundary 420 and a pectoral line 430, coarse boundary refinement receives additional parameters for the MLO view. The start model for the MLO view contains both an elliptical portion 720 and a straight-line portion 730 for the upper skin line. The elliptical and line portions 720 and 730 are passed together as a set of start points, marked in FIG. 7B by Xs, to coarse boundary refinement. Additionally, line parameters 740 of a pectoral line estimate are passed to coarse boundary refinement.

Figure 8:
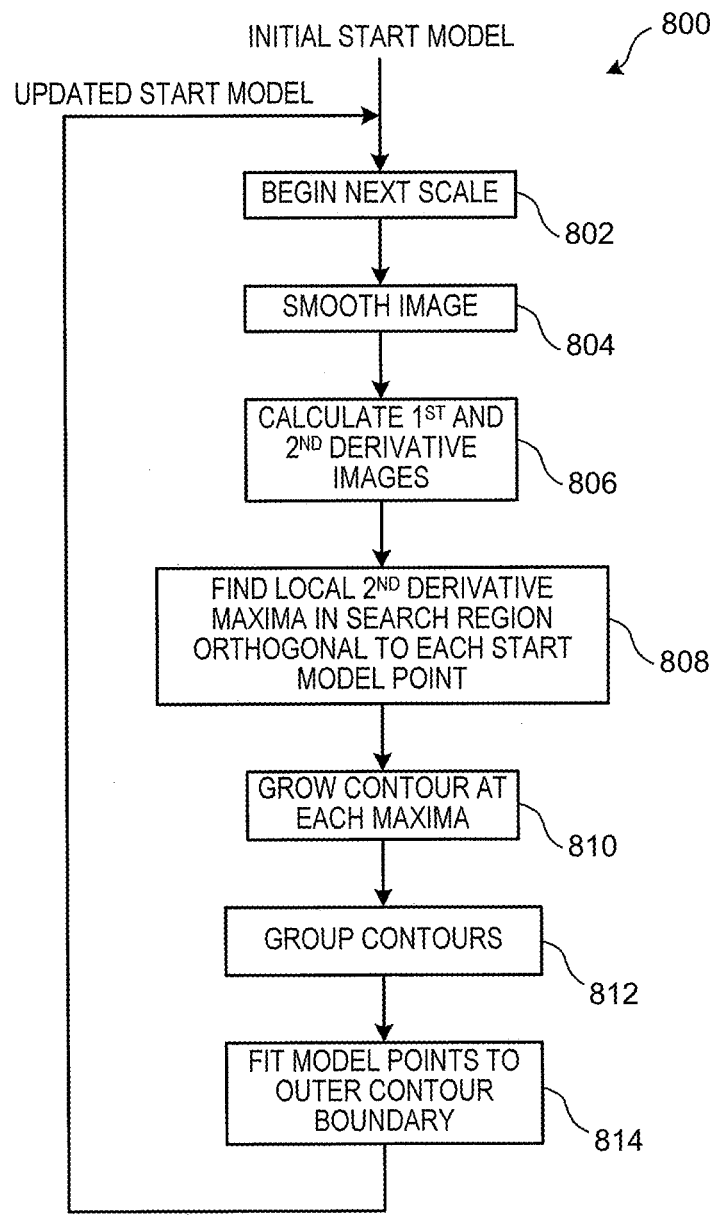
FIG. 8 contains a flowchart for refinement of the segmentation start model, according to an embodiment.

FIG. 8 contains a flowchart 800 for one embodiment of a scale-iterative process for segmenting along the breast skin line. Each iteration begins with a start model, e.g., one of the FIG. 7A/7B models for the first iteration, or an updated start model produced by a previous iteration. For the current iteration, a scale setting 802 determines for the current iteration the image scale and smoothing level to be applied, e.g., from a developer-programmed lookup table. In one embodiment, coarse boundary refinement uses an approximately 1000-micron pixel size, and fine boundary refinement uses an approximately 200-micron pixel size.

Briefly, each iteration performs the first and second derivative image calculations discussed above for the current scaled/smoothed image in a step 806. A step 808 finds second derivative maxima consistent with the estimated location and orientation of the breast skin line. For each such maximum, a step 810 then grows a contour. At a step 812, the contours are grouped, and finally a step 814 fits model points to the outer contour boundary.

Figure 9:
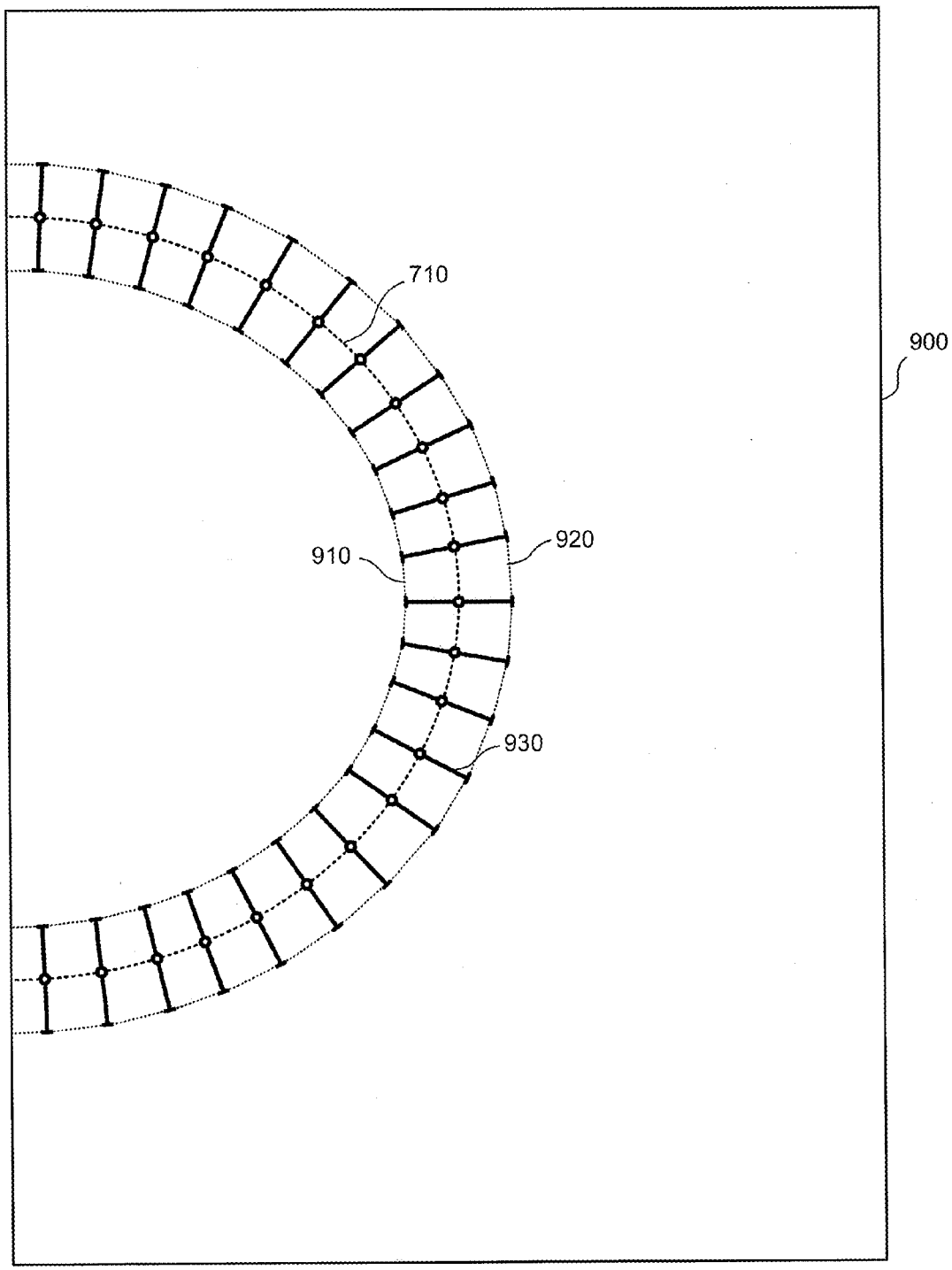
FIG. 9 illustrates a search region definition based on the segmentation start model.

FIG. 9 contains an illustration 900 of an exemplary second derivative maxima search pattern for a start model 710. The "true" skin line is assumed to lie in an uncertainty zone around the current model, e.g., between an inner uncertainty boundary 910 and an outer uncertainty boundary 920. The uncertainty zone can be wide for the initial iteration, and narrow somewhat for following iterations.

Figure 10:
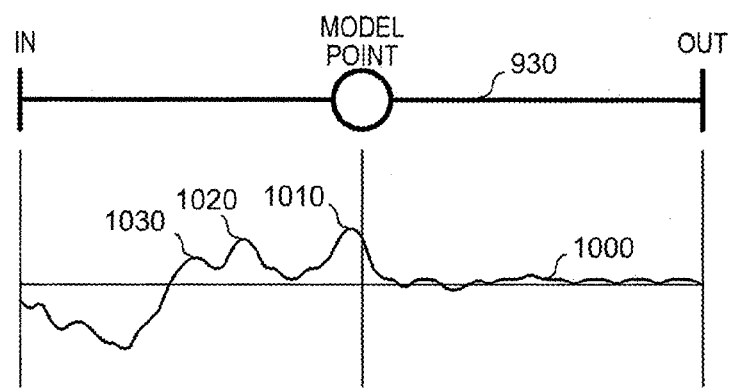
FIG. 10 depicts a curvature profile along a search line, for one model point of the segmentation search model.

For each model point, a second derivative maxima search proceeds orthogonal to the model point, between uncertainty boundaries 910 and 920. Illustration 900 shows exemplary search paths (one labeled 930) for a set of model points. Step 808 steps along model point search path 930 (and all other model point search paths) in interpolated single-pixel increments, and creates a start point for each second derivative maximum observed along the search path. For instance, FIG. 10 shows a second derivative profile 1000, plotted along search path 930. Three significant local maxima, 1010, 1020, 1030 exist along search path 930. The image coordinates of each such local maximum are used as a start point.

Figure 11:
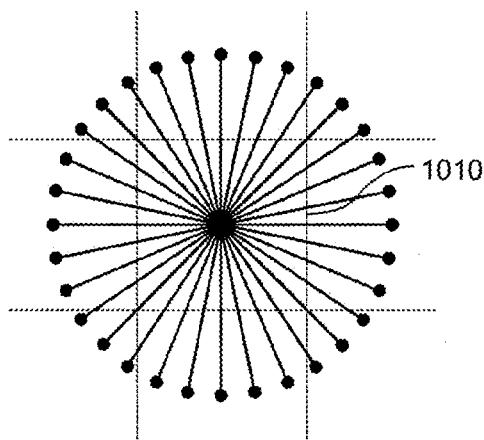
FIG. 11 shows, for one point along a curvature contour, 32 neighbor points to be considered for the next point along the curvature contour.

Step 810 grows a contour for each start point found in step 808. In one embodiment, prior to contour growth a smoothed version of the thresholded eigenvalue image is created. Sample neighbor smoothed eigenvalue statistics are gathered along 32 directions one pixel distance from the start pixel, e.g., as shown for start point 1010 in FIG. 11. A "noise" figure based on the variation in these 32 measurements determines whether any one of them can be significant as a real contour point.

Figure 12:
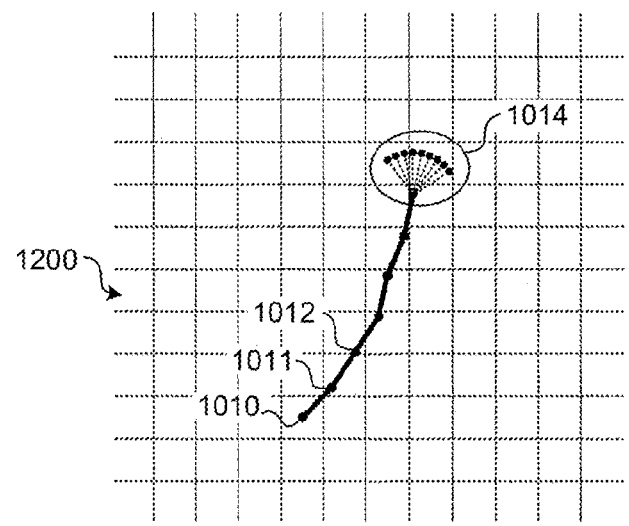
FIG. 12 shows a curvature contour as it is grown, including the next points considered for inclusion as the next point in the contour.

Once the noise figure is determined for start point 1010, a subset of the 32 measurement points adjacent point 1010 are considered as part of a contour that contains start point 1010. A maximum angle change allowed per step (to limit how fast the contour can bend) determines which measurement points are considered. For instance, in FIG. 12, a contour 1200 that started at point 1010 has grown through points 1011, 1012, etc., and is now considering a set of points 1014 as a next point on the contour. Points along the 32 search directions, but at more severe angles from the current direction of contour growth, are not considered.

Generally, points will be considered for inclusion on both ends of the contour. When no points meet the selection criteria on either end of the contour, or the contour reaches a maximum desired size, contour growth is terminated.

Figure 13:
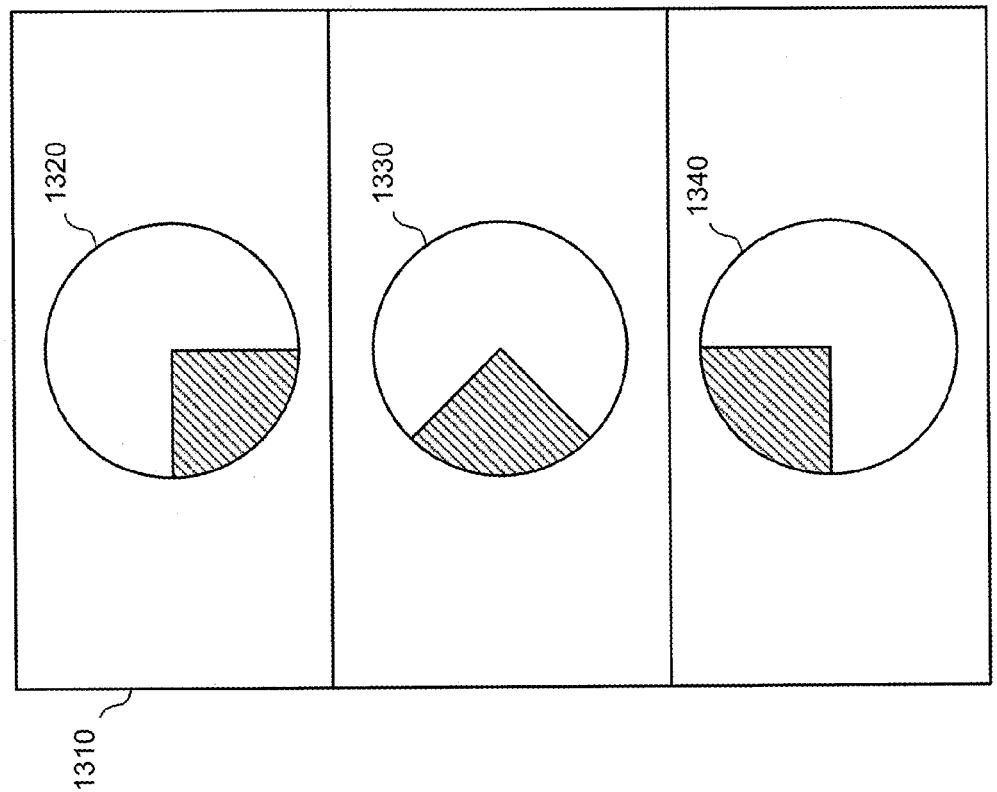
FIG. 13 illustrates a set of directional filters used to constrain contour growth along line directions that make sense for a breast boundary, for different sections of the input image.

For those points under consideration for adding to the end of contour 1200, additional limits can be considered. For instance, in FIG. 13 a set of angular filters 1310 determine whether an eigenvalue has an orientation indicative of skin line orientation. Angular filters 1310 enforce a directionality constraint on θ, based on location in the image. In the top third of the image, a directionality constraint 1320 requires the contour to be aligned somewhere between pointing to the left and pointing straight down. In the middle third of the image, a directionality constraint 1330 requires the contour to be aligned somewhere between pointing up and to the left at 45 degrees, and down and to the left at 45 degrees. And in the bottom third of the image, a directionality constraint 1340 requires the contour to be aligned somewhere between pointing to the left and pointing straight up. These constraints remove points from consideration from addition to a contour when the direction of curvature is inconsistent with expected skin line orientation.

Figure 14:
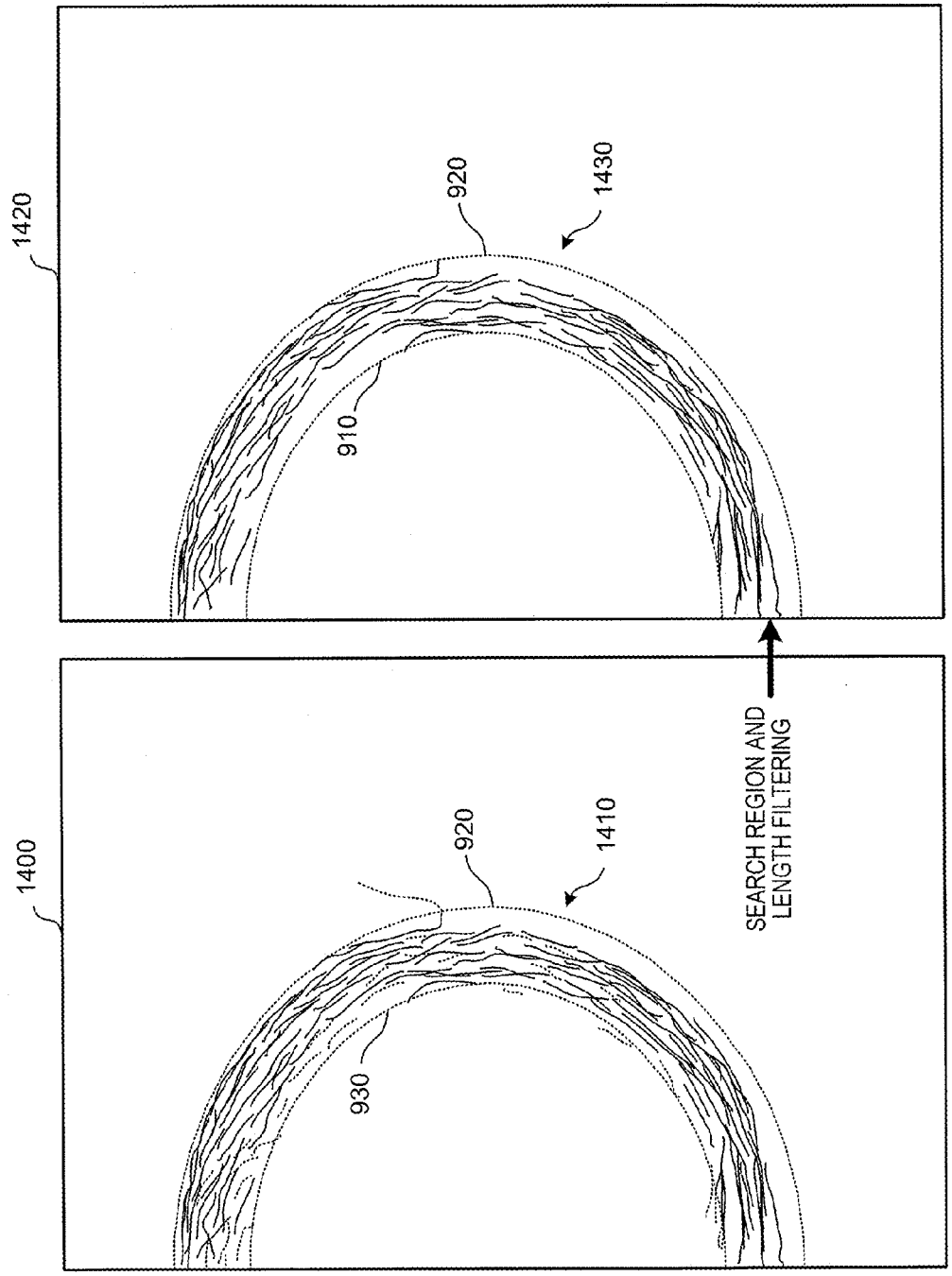
FIG. 14 shows the operation of a contour pruning process on an initial set of contours generated by the segmentation system.

After contour growth terminates, a contour can be pruned back or removed completely. FIG. 14 contains two exemplary contour maps, a pre-pruning map 1400 and a post-pruning map 1420. Pre-pruning map 1400 shows uncertainty region boundaries 910 and 920, overlaid with a full set of grown contours 1410. Of the contours shown, those contours or contour portions shown in dashed lines fail one or more pruning criteria, and are therefore removed to form a pruned contour set 1430 (post-pruning map 1420).

One example of a pruning criterion is a search region criterion. Although all contours begin between the uncertainty region boundaries 910 and 920, a contour may grow beyond the uncertainty region. When enforced, a search region criterion removes the portion of a contour lying outside of the uncertainty region.

Another example of a pruning criterion is a length criterion. Short contours can be removed according to a length threshold. Alternate measurements, such as the number of model point search paths crossed by a contour, may be even more indicative of successful or unsuccessful contour creation.

Contours remaining after pruning can affect an update of the breast skin line model. In one embodiment, the post-pruned contours 1430 receive several adjustments. First, each point on a contour is allowed to move slightly to better align with the "ridge" representing the maximum second derivative signature being followed by the contour (the contour may not be optimally aligned after growth, due to the discrete number of points considered). Second, the edge location can be adjusted to compensate for spreading due to the use of the smoothing filter.

Figure 15:
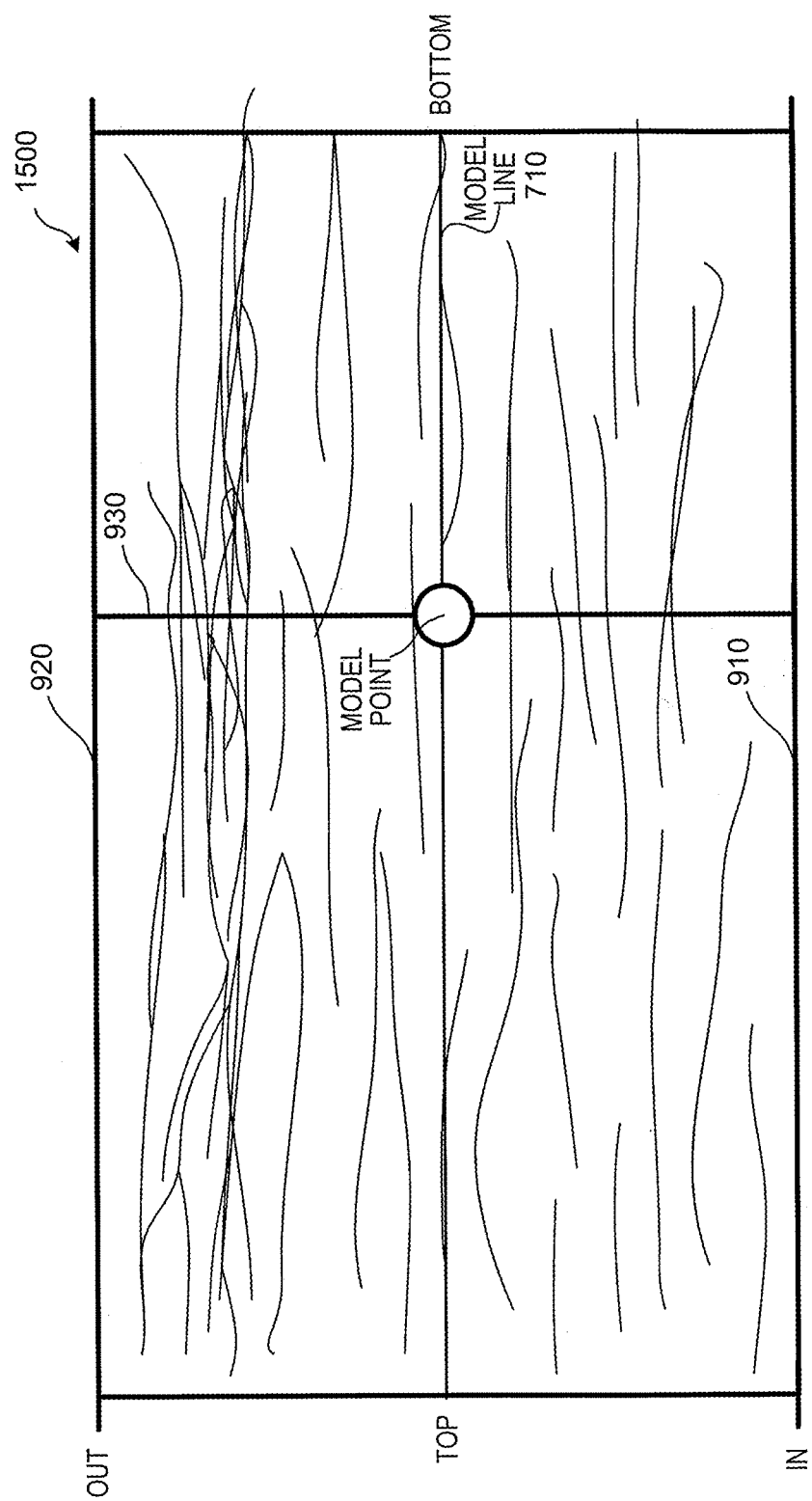
FIG. 15 illustrates contours mapped to a model space for detection of a breast skin line.

In one embodiment, the adjusted contours are mapped to a linear model space prior to contour grouping. Alternately, contours can be grouped in image space—but the grouping tasks are believed more efficiently performed in the linear model space. The linear model space performs a transform as follows (reference to the model space 1500 of FIG. 15 is suggested):

All model points lie on the x-axis in the model space, spaced apart proportional to their distances along the start model line;

The top end of the start model line 710 maps to the left end of the x-axis in the model space, and the bottom end of the start model line 710 maps to the right end of the x-axis in the model space;

The outer uncertainty region boundary 920 maps to the top of the model space;

The inner uncertainty region boundary 910 maps to the bottom of the model space;

Each search line 930 maps to a vertical line in the model space, passing through its associated model point;

Other points within the uncertainty region map proportionally to fill the model space.

Once the contours are mapped to model space 1500, it is likely that some contours will overlap (overlap can be defined as sharing one or more points, within a tolerance). Since a contour following maxima ridges is likely to cross a neighboring search line at a local maximum, a second contour will often be seeded at or near a successfully grown first contour. The fact that contours starting at multiple points grow similarly serves as some confirmation that the contour is real.

Where contours overlap, the contours are eligible to be placed in a common contour group. Control over grouping can be asserted through various checks, e.g., a requirement that two contours overlap over some minimum number of points or percentage of their points. When a contour C1 and a contour C2 are each groupable with a contour C3, all three contours can be joined in a common group. At each point along the model line, the median distance from the model line of all contours in the group becomes the distance from the model line of the group. Likewise, the contour strength of a group at a point along the model line is the sum of the individual contour strengths of the group members at that point along the model line.

Generally, the outer (uppermost in model space 1500) contours/contour groups indicate the location of the breast skin line, and will be selected as the updated model line. A particularly weak contour may, however, represent something other than the skin line. To avoid having a weak contour exert too much influence on the skin line position, an outermost contour can be rejected if its strength, relative to all strength, places the contour in the bottom M percentile of the contours/groups.

Once the system selects the contour(s)/contour group(s) that indicate the position of the skin line, the system updates the start model to follow along these contours/groups. The updated start model is then mapped from the model space back to image space. Thus the refinement process tends to move the breast boundary outward until no further supporting contours are located on the "out" side of the start model.

In one embodiment, fine refinement proceeds in almost identical fashion to coarse refinement, but on a more detailed image scale. To reduce computation for the more detailed data, fine refinement can, for each search line, only seed at most one contour, at the absolute maximum positive eigenvalue along that search line.

Figure 16:
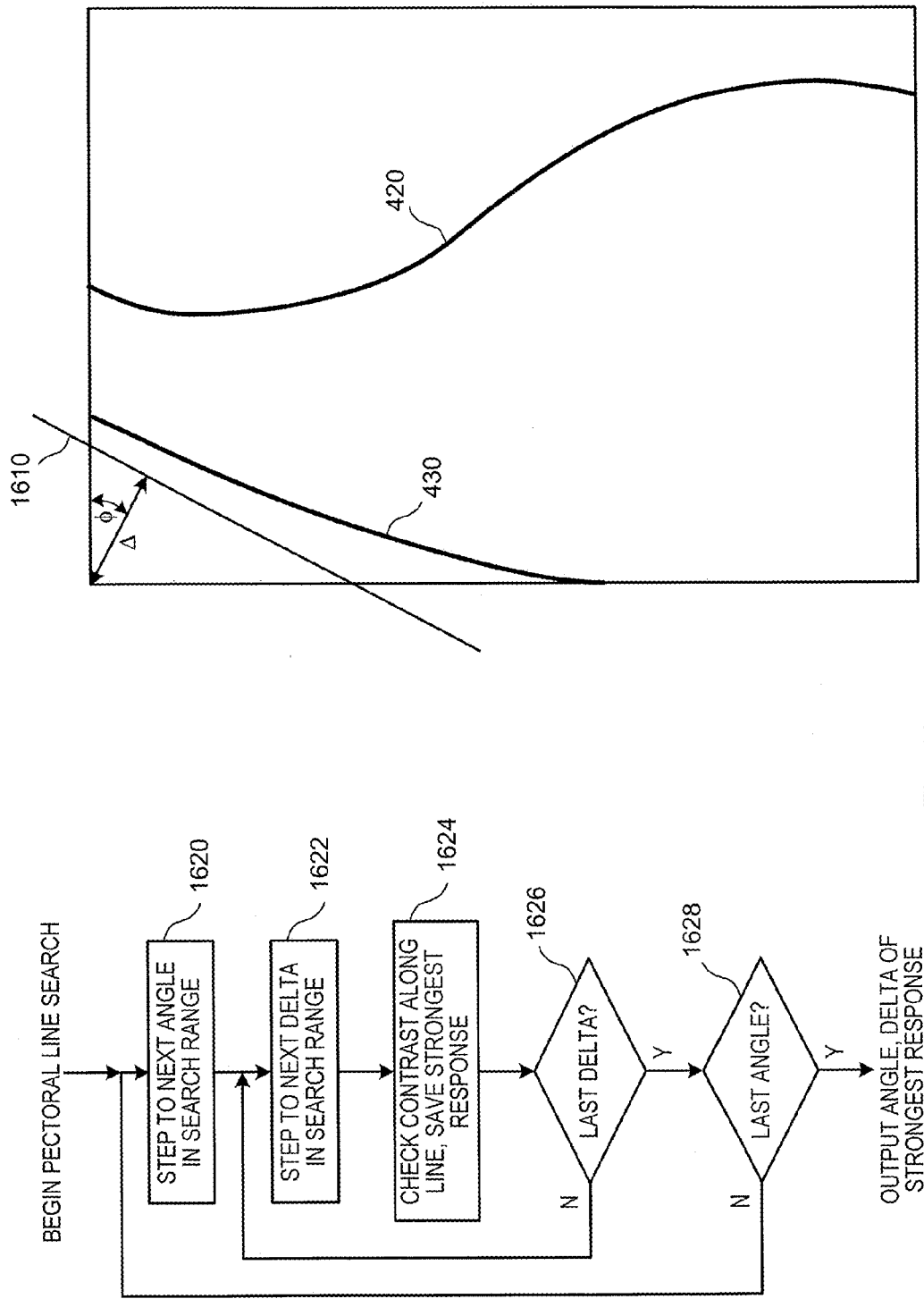
FIG. 16 depicts a process for finding the pectoral line in an MLO view.

For MLO views, it is expected that a pectoral line 430 (FIG. 16) will be visible inboard of the detected skin line, with bright image values on the inner side of the pectoral line. The system performs a pectoral line search over a range of search angles and a range of delta distances from the upper left corner of the image. Referring to the FIG. 16 flow chart, the search technique steps through search angles in the range at the outer loop beginning at block 1620 and ending at decision block 1628, which exits once the last angle has been tested. For each search angle, an inner loop beginning at block 1622 steps through all deltas in the search range, exiting the inner loop at block 1626 once the last delta has been tested. Within the inner loop, block 1624 checks contrast across a line 1610 defined by the current angle and delta, and saves the contrast, angle, and delta whenever the contrast is the greatest seen. When the outer loop exits from block 1628, the pectoral line parameters are the angle and delta recorded for the strongest response.

Unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless otherwise indicated.

Figure 17:
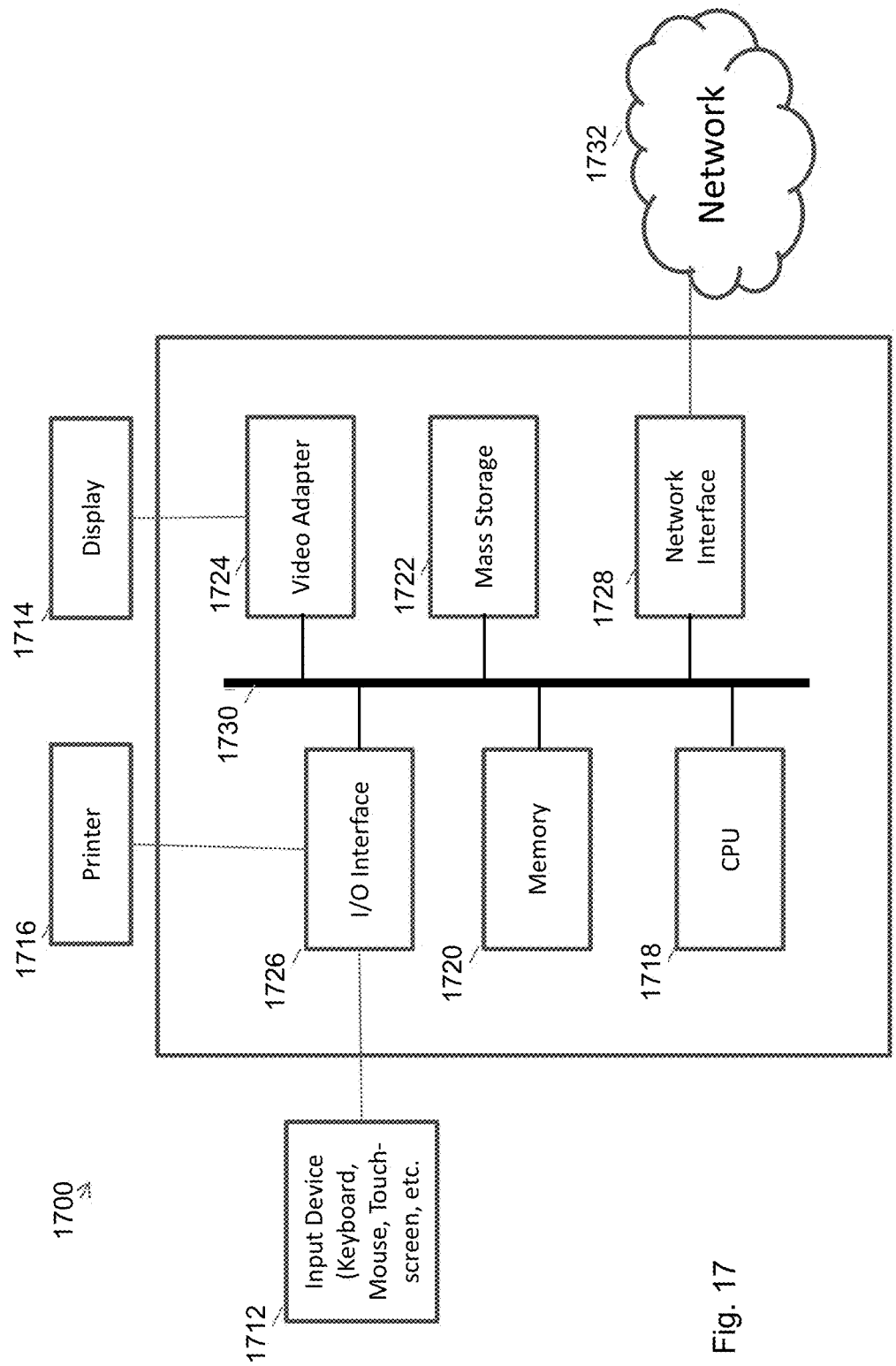
FIG. 17 is a block diagram of a desktop computing device in accordance with an embodiment of the present invention.

For example, FIG. 17 is a block diagram of a computing system 1700 that may also be used in accordance with an embodiment. It should be noted, however, that the computing system 1700 discussed herein is provided for illustrative purposes only and that other devices may be used. The computing system 1700 may comprise, for example, a desktop computer, a workstation, a laptop computer, a personal digital assistant, a dedicated unit customized for a particular application, or the like. Accordingly, the components of the computing system 1700 disclosed herein are for illustrative purposes only and other embodiments of the present invention may include additional or fewer components.

In an embodiment, the computing system 1700 comprises a processing unit 1710 equipped with one or more input devices 1712 (e.g., a mouse, a keyboard, or the like), and one or more output devices, such as a display 1714, a printer 1716, or the like. Preferably, the processing unit 1710 includes a central processing unit (CPU) 1718, memory 1720, a mass storage device 1722, a video adapter 1724, an I/O interface 1726, and a network interface 1728 connected to a bus 1730. The bus 1730 may be one or more of any type of several bus architectures including a memory bus or memory controller, a peripheral bus, video bus, or the like. The CPU 1718 may comprise any type of electronic data processor. For example, the CPU 1718 may comprise a processor (e.g., single core or multi-core) from Intel Corp. or Advanced Micro Devices, Inc., a Reduced Instruction Set Computer (RISC), an Application-Specific Integrated Circuit (ASIC), or the like. The memory 1720 may comprise any type of system memory such as static random access memory (SRAM), dynamic random access memory (DRAM), synchronous DRAM (SDRAM), read-only memory (ROM), a combination thereof, or the like. In an embodiment, the memory 1720 may include ROM for use at boot-up, and DRAM for data storage for use while executing programs. The memory 1720 may include one of more non-transitory memories.

The mass storage device 1722 may comprise any type of storage device configured to store data, programs, and other information and to make the data, programs, and other information accessible via the bus 1728. In an embodiment, the mass storage device 1722 is configured to store the program to be executed by the CPU 1718. The mass storage device 1722 may comprise, for example, one or more of a hard disk drive, a magnetic disk drive, an optical disk drive, or the like. The mass storage device 1722 may include one or more non-transitory memories.

The video adapter 1724 and the I/O interface 1726 provide interfaces to couple external input and output devices to the processing unit 1710. As illustrated in FIG. 17, examples of input and output devices include the display 1714 coupled to the video adapter 1724 and the mouse/keyboard 1712 and the printer 1716 coupled to the I/O interface 1726. Other devices may be coupled to the processing unit 1710.

The network interface 1728, which may be a wired link and/or a wireless link, allows the processing unit 1710 to communicate with remote units via the network 1732. In an embodiment, the processing unit 1710 is coupled to a local-area network or a wide-area network to provide communications to remote devices, such as other processing units, the Internet, remote storage facilities, or the like It should be noted that the computing system 1700 may include other components. For example, the computing system 1700 may include power supplies, cables, a motherboard, removable storage media, cases, a network interface, and the like. These other components, although not shown, are considered part of the computing system 1700. Furthermore, it should be noted that any one of the components of the computing system 1700 may include multiple components. For example, the CPU 1718 may comprise multiple processors, the display 1714 may comprise multiple displays, and/or the like. As another example, the computing system 1700 may include multiple computing systems directly coupled and/or networked.

Additionally, one or more of the components may be remotely located. For example, the display may be remotely located from the processing unit. In this embodiment, display information, e.g., locations and/or types of abnormalities, may be transmitted via the network interface to a display unit or a remote processing unit having a display coupled thereto.

Although several embodiments and alternative implementations have been described, many other modifications and implementation techniques will be apparent to those skilled in the art upon reading this disclosure. Various parameters and thresholds exist and can be varied for a given implementation with given data characteristics, with experimentation and ultimate performance versus computation time tradeoffs necessary to arrive at a desired operating point.

Many different statistical variations exist for combining measurements to form an estimate, and can be substituted for the exemplary techniques described herein for combining measurements.

Although the specification may refer to "an", "one", "another", or "some" embodiment(s) in several locations, this does not necessarily mean that each such reference is to the same embodiment(s), or that the feature only applies to a single embodiment.

What is claimed is:

1. A method for segmenting an image comprising pixels, the method comprising:
    generating a start model comprising a set of model points approximating an outline of an object in an initial image;
    subsampling the initial image at a first scale to generate a subsampled image;
    smoothing the subsampled image at a first smoothing level to generate a smoothed image;
    generating a curvature image by applying a second derivative operator to the smoothed image;
    locating, for each of the model points in the start model, second derivative local maxima in the curvature image that are orthogonal to a respective model point and within a search region having a first boundary on one side of the start model and a second boundary on an opposite side of the start model;
    generating a set of contours by growing a contour for each of the second derivative local maxima;
    shifting the start model to an outer boundary of the contours; and
    generating a segmentation mask of the object based on the shifted start model.

2. The method of claim 1, wherein the generating the curvature image further comprises applying a first derivative operator to the smoothed image.

3. The method of claim 1, wherein the generating the curvature image further comprises determining first and second eigenvalues and an angle of orientation at each point in the curvature image.

4. The method of claim 3, wherein the growing the contour comprises using the eigenvalues of curvature image points in a plurality of directions around the respective model point to determine a growth direction of the contour.

5. The method of claim 3, wherein the growing the contour comprises using a maximum angle change per growth step and/or an angular filter to determine a growth direction of the contour.

6. The method of claim 1, wherein the generating the set of contours further comprises pruning contours having at least a portion outside of the search region and/or having a length less than a length threshold.

7. The method of claim 1, wherein the generating the set of contours further comprises grouping together overlapping ones of the contours.

8. The method of claim 7, further comprising mapping the set of contours to a linear model space before the grouping.

9. The method of claim 1, wherein the generating the set of contours comprises utilizing each of the second derivative local maxima as a starting point to grow each respective contour.

10. The method of claim 1, further comprising repeating the subsampling, the smoothing, the generating a curvature image, the locating the local maxima, and the generating the set of contours steps using the shifted start model, a second scale and a second smoothing level.

11. The method of claim 1, wherein the image is a mammogram image, and wherein the object is a breast.

12. A system for segmenting an image comprising pixels, the system comprising:
- a object model generator generating a start model comprising a set of model points approximating an outline of an object in an initial image;
- an image subsampler subsampling the initial image at a first scale to generate a subsampled image;
- an image smoother smoothing the subsampled image at a first smoothing level to generate a smoothed image;
- a curvature image generator generating a curvature image by applying a second derivative operator to the smoothed image;
- a local maxima detector locating, for each of the model points in the start model, second derivative local maxima in the curvature image that are orthogonal to a respective model point and within a search region having a first boundary on one side of the start model and a second boundary on an opposite side of the start model;
- a contour generator generating a set of contours by growing a contour for each of the second derivative local maxima;
- an object model shifter shifting the start model to an outer boundary of the contours; and
- a segmentation mask generator generating a segmentation mask of the object based on the shifted start model.

13. A computer program product for segmenting an image, the computer program product having a non-transitory computer-readable medium with a computer program embodied thereon, the computer program comprising:
- computer program code for generating a start model comprising a set of model points approximating an outline of an object in an initial image;
- computer program code for subsampling the initial image at a first scale to generate a subsampled image;
- computer program code for smoothing the subsampled image at a first smoothing level to generate a smoothed image;
- computer program code for generating a curvature image by applying a second derivative operator to the smoothed image;
- computer program code for locating, for each of the model points in the start model, second derivative local maxima in the curvature image that are orthogonal to a respective model point and within a search region having a first boundary on one side of the start model and a second boundary on an opposite side of the start model;
- computer program code for generating a set of contours by growing a contour for each of the second derivative local maxima;
- computer program code for shifting the start model to an outer boundary of the contours; and
- computer program code for generating a segmentation mask of the object based on the shifted start model.

14. The computer program product of claim 13, wherein the computer program code for generating the curvature image further comprises computer program code for applying a first derivative operator to the smoothed image.

15. The computer program product of claim 13, wherein the computer program code for generating the curvature image further comprises computer program code for determining first and second eigenvalues and an angle of orientation at each point in the curvature image.

16. The computer program product of claim 15, wherein the computer program code for growing the contour comprises computer program code for using the eigenvalues of curvature image points in a plurality of directions around the respective model point to determine a growth direction of the contour.

17. The computer program product of claim 15, wherein the computer program code for growing the contour comprises computer program code for using a maximum angle change per growth step and/or an angular filter to determine a growth direction of the contour.

18. The computer program product of claim 13, wherein the computer program code for generating the set of contours further comprises computer program code for pruning contours having at least a portion outside of the search region and/or having a length less than a length threshold.

19. The computer program product of claim 13, wherein the computer program code for generating the set of contours further comprises computer program code for grouping together overlapping ones of the contours.

20. The computer program product of claim 19, further comprising computer program code for mapping the set of contours to a linear model space before the grouping.

21. The computer program product of claim 13, wherein the computer program code for generating the set of contours comprises computer program code for utilizing each of the second derivative local maxima as a starting point to grow each respective contour.

22. The computer program product of claim 13, further comprising computer program code for repeating the subsampling, the smoothing, the generating a curvature image, the locating the local maxima, and the generating the set of contours steps using the shifted start model, a second scale and a second smoothing level.

23. The computer program product of claim 13, wherein the image is a mammogram image, and wherein the object is a breast.

* * * * *

UNITED STATES PATENT AND TRADEMARK OFFICE
CERTIFICATE OF CORRECTION

| | | |
|---|---|---|
| PATENT NO. | : 8,675,933 B2 | Page 1 of 1 |
| APPLICATION NO. | : 13/168588 | |
| DATED | : March 18, 2014 | |
| INVENTOR(S) | : Jeffrey C. Wehnes | |

It is certified that error appears in the above-identified patent and that said Letters Patent is hereby corrected as shown below:

On Title page, Item (60) Related U.S. Application Data, lines 11-14, delete "provisional application No. 61/398,571, filed on Jun. 25, 2010, provisional application No. 61/399,094, filed on Jul. 7, 2010, provisional application No. 61/400,573, filed on Jul. 28, 2010".

Signed and Sealed this
Ninth Day of September, 2014

Michelle K. Lee
*Deputy Director of the United States Patent and Trademark Office*